US006975745B2

(12) United States Patent
Bradley

(10) Patent No.: US 6,975,745 B2
(45) Date of Patent: Dec. 13, 2005

(54) SYNCHRONIZING WATERMARK DETECTORS IN GEOMETRICALLY DISTORTED SIGNALS

(75) Inventor: Brett A. Bradley, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 720 days.

(21) Appl. No.: 10/033,363

(22) Filed: Oct. 25, 2001

(65) Prior Publication Data

US 2003/0081810 A1 May 1, 2003

(51) Int. Cl.$^7$ .................................................. H04K 1/00
(52) U.S. Cl. .................................... 382/100; 382/294
(58) Field of Search ................................ 382/100, 232, 382/294; 380/210, 287, 54; 713/176

(56) References Cited

U.S. PATENT DOCUMENTS

| 5,835,639 A | | 11/1998 | Honsinger et al. ........... 382/278 |
| 5,857,038 A | | 1/1999 | Owada et al. ............... 382/284 |
| 5,859,920 A | | 1/1999 | Daly et al. .................. 382/115 |
| 5,949,055 A | | 9/1999 | Fleet et al. .................. 235/469 |
| 6,108,434 A | * | 8/2000 | Cox et al. .................... 382/100 |
| 6,122,403 A | | 9/2000 | Rhoads ......................... 382/233 |
| 6,154,571 A | | 11/2000 | Cox et al. .................... 382/250 |

(Continued)

FOREIGN PATENT DOCUMENTS

| EP | 1156660 A2 | 11/2001 | ............ H04N/1/32 |
| WO | WO 99/45706 A2 * | 9/1999 | ............ H04N/5/913 |
| WO | WO 01/11563 A1 * | 2/2001 | ............ G06T/1/00 |
| WO | WO01/24113 A1 | 4/2001 | ............ G06T/1/00 |
| WO | WO02/11051 A2 | 2/2002 | ............ G06K/9/00 |
| WO | WO02/13138 A1 | 2/2002 | ............ G06T/1/00 |
| WO | WO02/065753 A1 | 8/2002 | ............ H04N/1/32 |
| WO | WO02/087250 A1 | 10/2002 | ............ H04N/7/24 |

OTHER PUBLICATIONS

Johnson et al., "Recovery of Watermarks from Distorted Images," *Proc. 3$^{rd}$ Int. Workshop on Information Hiding, LNCS* vol. 1768, Sept./Oct. 1999, pp. 318–332.*

Su et al., "Synchronized Detection of the Block–based Watermark with Invisible Grid Embedding," *Proc. SPIE vol. 4314: Security and Watermarking of Multimedia Contents III,* Jan. 2001, pp. 406–417.*

Osborne et al., "Image and Watermark Registration for Monochrome and Coloured Images," *Proc. DICTA '97,* Dec. 1997, pp. 59–64.*

Tirkel et al., "Image and watermark registration," *Signal Processing,* vol. 66, May 1998, pp. 373–383.*

Kutter, "Watermarking resisting to translation, rotation, and scaling," *Proc. SPIE vol. 3528: Multimedia Systems and Applications,* Nov. 1998, pp. 423–431.*

Maes et al., "Exploiting Shift Invariance to Obtain a High Payload In Digital Image Watermarking," *IEEE Proc. Int. Conf. on Multimedia Computing and Systems,* Jun. 1999, pp. 7–12.*

*Primary Examiner*—Andrew W. Johns
(74) *Attorney, Agent, or Firm*—Digimarc Corporation

(57) ABSTRACT

A method of synchronizing a digital watermark detector divides a watermarked signal into blocks, each block including a portion of a watermark signal. For each block, the method computes a local correlation space comprising a neighborhood of correlation values by correlating the watermarked data in the block with a known watermark signal at a neighborhood around the block. It then finds a correlation maxima in the local correlation space for each block, where the correlation maxima indicates a local offset used to align the watermarked data in the block before decoding a watermark message from the block. To further refine the synchronization, the method filters the array of local offsets for the blocks to provide a refined set of offsets. The offsets and corresponding correlation values provide an indicator of where message symbol decoding will provide more accurate results, enabling the watermark message decoder to selectively decode symbols from portions of a signal block containing a watermark signal.

7 Claims, 1 Drawing Sheet

U.S. PATENT DOCUMENTS

| | | |
|---|---|---|
| 6,205,249 B1 | 3/2001 | Moskowitz .................. 382/232 |
| 6,263,086 B1 * | 7/2001 | Wang ........................ 382/100 |
| 6,278,792 B1 | 8/2001 | Cox et al. ................... 382/100 |
| 6,342,924 B1 | 1/2002 | Ikeda et al. ................. 348/473 |
| 6,408,082 B1 | 6/2002 | Rhoads et al. .............. 382/100 |
| 6,418,232 B1 | 7/2002 | Nakano et al. ............. 382/100 |
| 6,424,725 B1 | 7/2002 | Rhoads et al. .............. 382/100 |
| 6,456,727 B1 | 9/2002 | Echizen et al. ............. 382/100 |
| 6,563,935 B1 | 5/2003 | Echizen et al. ............. 382/100 |
| 6,577,744 B1 | 6/2003 | Braudaway et al. ........ 382/100 |
| 6,614,914 B1 | 9/2003 | Rhoads et al. .............. 382/100 |
| 6,738,493 B1 * | 5/2004 | Cox et al. ................... 382/100 |
| 6,845,170 B2 | 1/2005 | Wendt ........................ 382/100 |
| 2002/0002679 A1 | 1/2002 | Murakami et al. .......... 713/176 |
| 2002/0015509 A1 | 2/2002 | Nakamura et al. .......... 382/100 |
| 2002/0021823 A1 | 2/2002 | Muratani .................... 382/100 |
| 2002/0054692 A1 | 5/2002 | Suzuki et al. ............... 382/100 |
| 2002/0094082 A1 | 7/2002 | Jones et al. ................. 380/219 |
| 2002/0114490 A1 | 8/2002 | Taniguchi et al. .......... 382/100 |
| 2002/0126870 A1 | 9/2002 | Wendt ........................ 382/100 |
| 2002/0131617 A1 | 9/2002 | Pelly et al. ................. 382/100 |
| 2003/0086587 A1 | 5/2003 | Haitsma et al. ............. 382/100 |
| 2003/0099372 A1 | 5/2003 | Wendt ........................ 382/100 |

* cited by examiner

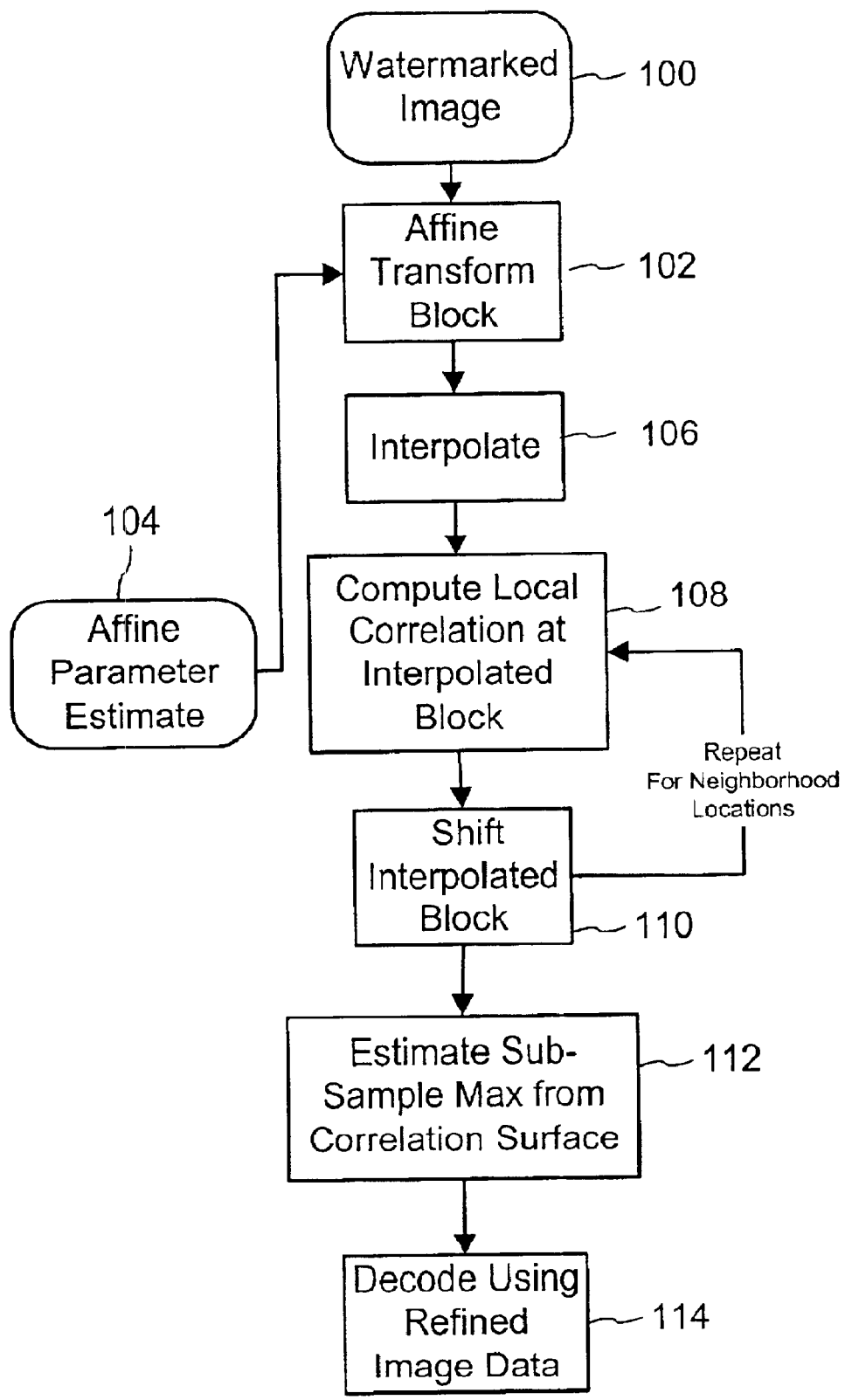

SYNCHRONIZING WATERMARK DETECTORS IN GEOMETRICALLY DISTORTED SIGNALS

TECHNICAL FIELD

The invention relates to steganography, data hiding, and digital watermarking.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 6,122,403, which are hereby incorporated by reference.

One particular problem in digital watermarking applications is synchronizing a detector to deal with geometric warping distortion of a watermarked image. A number of techniques have been developed for dealing with geometric distortion in watermarked images. One technique is to make the watermark more robust to geometric distortion by embedding it in attributes of the image that are relatively invariant to geometric distortion. While this improves detection in some cases, it typically does not address all forms of geometric distortion and more complex, non-linear geometric distortion. Another technique is to include geometric calibration features in the watermark signal that enable detection and estimation of the geometric distortion parameters, such as rotation and scale. These features include, for example, calibration signal peaks in a particular transform domain, such as the autocorrelation domain and/or Fourier domain. These techniques use correlation techniques or other pattern matching methods to estimate affine geometric distortion parameters. For example, cross correlation of the received signal and the calibration signal in particular transform domains produce correlation peaks that correspond to affine distortion parameters, such as rotation, scale, translation, shear, and differential scale.

Such techniques do not provide error free estimation of geometric distortion. In some cases, errors result from estimation, even where the geometric distortion is linear. In addition, affine transform parameters can only approximate geometric distortion that is non-linear. For example, it can provide a piecewise linear estimate of affine distortion in sub-blocks of an image, but it cannot always accurately represent non-linear distortion in a manner that leads to error free recovery of the digital watermark message.

Similar problems occur in audio watermarking where temporal distortions, such as pitch invariant time scale changes, linear speed changes, up/down sampling, cropping, and lossy compression, make it difficult to synchronize the detector for accurate decoding of embedded message payloads. These and other distortions introduce a form of geometric distortion of the digital watermark signal in the host audio signal.

The invention provides a method for synchronizing a watermark detector. One aspect of the invention is a method of synchronizing a digital watermark detector. The detector operates on a watermarked signal where a watermark signal has been distributed throughout the host media signal, and preferably, repeatedly embedded in segments of the host media signal (e.g., music, image or video signal). The method divides a watermarked signal into blocks, each block including a portion of a watermark signal. For example, in the case where the watermark is replicated in segments of the host signal, these blocks sub-divide each segment into smaller parts. For each block, the method computes a local correlation space comprising a neighborhood of correlation values by correlating the watermarked data in the block with a known watermark signal at a neighborhood around the block. It then finds a correlation maxima in the local correlation space for each block, where the correlation maxima indicates a local offset used to align the watermarked data in the block before decoding a watermark message from the block.

This method applies to watermarked signals of varying media types. In addition, it may be used to synchronize watermark detection and message reading in various signal domains, such as a spatial domain, temporal domain, frequency domain, or some other transform domain (e.g., autocorrelation, wavelet, Fourier, etc.). For example, it can be applied in the spatial domain or spatial frequency domain for images and video frames, as well as the time or frequency domain for audio. It may also be applied in the time-frequency domain for audio and video signals.

In one implementation, the method uses an estimate of affine geometric distortion parameters to transform an image block in the watermarked image to a position approximating an original orientation of the image block in the watermarked image. It then shifts the transformed image block to neighboring locations. The method then computes a correlation surface by finding the correlation between the watermark signal and the transformed block at its location and each of the neighboring locations. The method finds a correlation maximum in the correlation surface formed by the correlation values in the neighborhood. The location of the correlation maximum provides an offset value that further refines the orientation of the image data. A message decoder then decodes a watermark message from the watermarked image adjusted by the offset value.

Further features will become apparent with reference to the following detailed description and accompanying drawings.

BRIEF DESCRIPTION OF THE DRAWINGS

FIG. 1 is a flow diagram of a method for synchronizing a watermark detector.

DETAILED DESCRIPTION

FIG. 1 is a flow diagram of a method for synchronizing a watermark detector. The method operates on a watermarked image 100 that has been geometrically distorted, either intentionally or unintentionally. Before the method begins, a global synchronization method, such as those described in watermarking literature is used to compute an estimate of the affine geometric distortion of the image since being embedded with the digital watermark.

The method operates on small blocks of pixels within an image frame. To extract a watermark message from the block, a watermark reader first needs to determine the geometric distortion and compensate for it. The method described here attempts to provide a more accurate measure of the geometric distortion by refining the estimate of affine geometric distortion.

To accomplish this, the method applies the affine transform to the small block (102) using the estimated affine transform parameters (104). The method interpolates the image samples computed from the affine transform to compute image sample values at discrete sample locations within the transformed block. These interpolated sample values form a block of image data approximating a block in the watermarked image at the time of embedding. However, errors due to estimation and non-linear distortion remain.

Next, the method computes the local correlation between the known component of the watermark signal and the interpolated block (108). The method then shifts the interpolated block by one discrete sample location to each of the 8 neighboring locations (110). For each of these locations, it repeats the correlation computation. The correlation is computed as the inner product of the interpolated/shifted version of the watermarked image block and the watermark signal block expected for that location based on the affine transform parameters. In total, the correlation process produces a two dimensional array (e.g., 3 by 3) of correlation values, forming a correlation surface from the block. Since the interpolated and corresponding shifted blocks are comprised of image samples at integer locations, the correlation surface is also comprised of correlation values at integer locations.

The method then estimates the sub-sample location of the correlation maximum in the correlation surface. While there are alternative ways to compute this sub-sample location, our current implementation uses a center of mass approach. The center of mass location identifies a sub-sample offset location and corresponding offset value that may be used to align the data before decoding the watermark message symbols embedded in it. If the watermark signal is present with sufficient energy based on the correlation value and the offset exceeds a threshold value, it is used to realign the image data in the block before watermark decoding.

The implementation repeats the above process on small blocks across the watermarked image. In our implementation, the complete watermark message is replicated in larger blocks throughout the image, and the small blocks are sub-blocks of the larger block. As such, the entire message can be extracted from a subset of the image using a collection of the smaller blocks.

By repeating the above process for rows and/or columns of sub-blocks, the watermark detector generates an array of sub-sample offsets, each providing an estimate of coordinates used to align local blocks of the watermarked data before watermark message extraction. A further enhancement of the method stores these sub-sample offsets and applies curve fitting to fit the offsets (e.g., the horizontal and vertical translational shift vectors) to a curve. This curve fitting process filters the array of offsets to provide a refined array of sub-sample offsets. This refined set of offsets is then used to align the watermark image data before performing message decoding operations.

A further enhancement is to use the offsets and the correlation values associated with each one to get more accurate alignment coordinates. In particular, the curve fitting model weights the offsets by their corresponding correlation value so that offsets with lower correlation values are given less weight. Further, in locations where the correlation values are low or the offset values appear noisy, the watermark detector can target message decoding operations away from these locations, and instead, focus on blocks of data that have higher correlation values and/or less noisy offset values. To get more accurate message decoding, the watermark reader selectively decodes embedded message symbols from sub-blocks within a block carrying a watermark signal, where the sub-blocks have higher detection metrics as indicated by the correlation values and array of offsets of neighboring sub-blocks. This enables message decoding operations to be focused on localized regions within a block of the received signal.

While the message decoding operations vary depending on the nuances of the watermark embedding method, our implementation decodes message symbols as follows. It begins by predicting the values of chips in a spread spectrum signal from the re-aligned data. Multiple chips map to each embedded error correction encoded message element. For each error correction encoded message signal element, the chips are aggregated to produce a soft value, which is input to a Viterbi decoder. The Viterbi decoder performs error correction decoding to recover message symbol elements.

Other forms of message decoding may be used depending on the nature of the embedding methodology, such as mapping image attribute values into quantization bins, correlation based message symbol decoding, etc.

There are a number of potential variations and enhancements to the digital watermark detection method described above. The method refines the synchronization of the watermark signal by computing a number of local correlations on blocks throughout the received signal. For each localized correlation around a block of watermarked data, the method computes a local correlation space comprising an array of correlation values by correlating a known portion of the watermark signal with the block of watermarked data. It then finds the maximum correlation peak in this local correlation space. The process of finding the correlation peak can include a variety of techniques, such as the center of mass calculation described above, as well as a median calculation. Another way to locate the peak is to apply an interpolation filter followed by a reconstruction filter to the local correlation space. For example, in an image, one way to locate the peak is to first up-sample the local correlation space, and then find the sub-pixel point with maximum correlation as the offset estimate.

The method provides an efficient way to synchronize watermark detection at local points in the watermarked signal because it avoids repeated interpolation calculations to find the appropriate local reference coordinate for reading embedded symbols of the watermark message (e.g., x-y coordinates or time coordinates used to align the watermark reader on a block of data). The method can be applied to small sub-blocks of data, such as a 32 by 32 or 16 by 16 block of pixels, even if the entire watermark signal is spread over a larger area. By reducing the size of the local correlation space, the method can provide refined synchronization offsets over a smaller area. However, the size of the block needs to be large enough to provide meaningful correlation values.

The above method applies to a variety of media types, like video and audio. In audio, the synchronization technique may be applied to time segments within the watermarked audio signal. For example, consider a case where a watermark signal is replicated in blocks of the audio signal. The method computes local correlation spaces around sub-blocks of the audio blocks including a portion of a watermark signal. It then finds the correlation maxima in the local correlation space, and the coordinates of the maxima align the message reader to decode embedded message symbols that form part of the watermark signal in that sub-block.

The above method applies to data in different domains, such as the spatial domain or spatial frequency domain for still and moving images, and time or frequency domain for audio signals. It may also be applied to the time-frequency domain for audio and video signals. For example, it can be used in the synchronization of a time-frequency domain watermark for audio or video signals, such as described in co-pending U.S. patent application Ser. No. 09/661,900, which is hereby incorporated by reference.

The method enables improved detection in cases where the watermarked signal is distorted by one or more processes, such as geometric distortion, time scale distortion, distortion due to lossy compression, Analog to Digital or Digital to Analog conversion, etc.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of synchronizing a watermark detector operating on a watermarked image, the method comprising:

using an estimate of affine geometric distortion parameters to transform an image block in the watermarked image to a position approximating an original orientation of the image block in the watermarked image;

shifting the transformed image block to neighboring locations;

computing correlation between the transformed image block and a watermark signal, including computing correlation between the watermark signal and the transformed image block shifted to each of the neighboring locations to create a correlation surface;

finding a correlation maximum in the correlation surface;

computing an offset value from the correlation maximum;

adjusting the watermarked image data by the offset value; and decoding a watermark message from the watermarked image adjusted by the offset value.

2. The method of claim 1 including repeating the process of claim 1 for blocks in the watermarked image;

fitting a curve to the offset values of blocks in the image; and using the curve to align image data in the watermarked image before decoding the watermark message from the watermarked image.

3. A computer readable medium on which is stored instructions for performing the method of claim 1.

4. A method of synchronizing a digital watermark detector comprising:

dividing a watermarked signal into blocks, each block including a portion of a watermark signal;

for each block, computing a local correlation space comprising a neighborhood of correlation values by correlating the watermarked data in the block with a known watermark signal at a neighborhood around the block;

finding a correlation maxima in the local correlation space for each block, where the correlation maxima indicates a local offset used to align the watermarked data in the block before decoding a watermark message from the block.

5. The method of claim 4 further including:

performing curve fitting on the local offsets for the blocks to compute refined offsets.

6. The method of claim 5 wherein the curve fitting weights local offsets based on the corresponding correlation maxima values.

7. The method of claim 4 wherein the correlation maxima are used to indicate which portions of the watermarked signal have reliable watermark message data, such that watermark message decoding is performed selectively from blocks that have higher correlation maxima.

* * * * *